United States Patent
Liu et al.

(10) Patent No.: US 11,754,123 B2
(45) Date of Patent: Sep. 12, 2023

(54) BEARING HOUSING AND ITS APPLICATIONS

(71) Applicant: Aktiebolaget SKF, Gothenburg (SE)

(72) Inventors: Jiakai Liu, Shanghai (CN); Weiguang Cao, Changshu (CN); Zongkang Xu, Suzhou (CN); Weifei Geng, Shanghai (CN)

(73) Assignee: Aktiebolaget SKF, Gothenburg (SE)

( * ) Notice: Subject to any disclaimer, the term of this patent is extended or adjusted under 35 U.S.C. 154(b) by 2 days.

(21) Appl. No.: 17/479,013

(22) Filed: Sep. 20, 2021

(65) Prior Publication Data

US 2022/0128095 A1    Apr. 28, 2022

(30) Foreign Application Priority Data

Oct. 27, 2020   (CN) .......................... 202011164794.7

(51) Int. Cl.
*F16C 37/00* (2006.01)
*B22D 11/128* (2006.01)

(52) U.S. Cl.
CPC ........ *F16C 37/007* (2013.01); *B22D 11/1287* (2013.01); *F16C 2322/00* (2013.01)

(58) Field of Classification Search
CPC .................................................. F16C 37/007
See application file for complete search history.

(56) References Cited

U.S. PATENT DOCUMENTS 5,915,843 A * 6/1999 Mattera ................. F16C 37/007
                                                              384/321
9,281,462 B2 * 3/2016 Bartl ....................... H01L 35/30

FOREIGN PATENT DOCUMENTS

WO   WO2004/104434   * 12/2004
WO   WO2015129823   *  9/2015

* cited by examiner

*Primary Examiner* — James Pilkington
(74) *Attorney, Agent, or Firm* — GARCIA-ZAMOR INTELLECTUAL PROPERTY LAW, LLC; Ruy Garcia-Zamor

(57) ABSTRACT

A bearing housing is provided with a cooling channel in at least part of the circumference around the bearing. The cooling channel is provided with a flow guide member at least in part of its flow section to construct a tortuous passage whose flow distance is longer than the corresponding circumferential length of the flow section. On the basis of the above-mentioned bearing housing, the present invention also provides a bearing housing unit, a continuous casting roll line and a continuous casting machine that use the bearing housing. The above-mentioned bearing housing adopts an optimized cooling channel design, which can obtain a better cooling effect without changing other structures of the bearing housing. Therefore, it is particularly suitable for upgrading existing equipment and has a huge cost advantage and a wide range of application prospects.

8 Claims, 3 Drawing Sheets

BEARING HOUSING AND ITS APPLICATIONS

CROSS-REFERENCE TO RELATED APPLICATIONS

This application claims priority to Chinese Patent Application no. 202011164794.7, filed Oct. 27, 2020, the contents of which is fully incorporated herein by reference.

TECHNICAL FIELD

The invention relates to a bearing housing, and a bearing housing unit, a continuous casting roll line and a continuous casting machine that use the bearing housing.

BACKGROUND ART

The high temperature working condition of the continuous casting machine poses a serious threat to the reliable operation of the bearings. FIG. 1 is a schematic cross-sectional diagram of the structure of a continuous casting roll line in a continuous casting machine. It can be seen from the figure that the continuous casting roll line 100 is supported on the bearing housing units 30 composed of the bearing housing 10 and the bearing 20. The side of the bearing housing 10 facing the steel billet (on the upper side in the figure) is very close to the hot steel billet, causing the internal bearing 20 and seals to be easily damaged, and the high temperature will accelerate the aging of the grease inside the bearing. For this reason, the bearing housing 10 is provided with a cooling channel 1 in most part of its circumference around the bearing 20, which is intended to reduce the temperature inside the bearing housing by means of forced water cooling.

FIG. 2 is a schematic diagram of the morphological distribution of a traditional cooling channel in the bearing housing. It can be seen with reference to FIG. 1 that the radial size of the bearing housing 10 is limited by the entire roller line 100 and so the bearing housing, if too large, may easily touch the billet and get damaged. If the radial size of the bearing is compressed in order to increase the radial size of the cooling channel 1, the load-bearing capacity of the roller line 100 will be decreased. In view of this, although the various technical efforts intended to increase the water flow by enlarging the radial size of the cooling channel 1 can contribute to a certain degree of improvement in the cooling effect, they cannot overcome the actual bottleneck of the size limitation in the end. The bearing components in the bearing housing are still under the threat of the thermal effect of the billet.

More severely, the higher requirements for billet quality have also determined the new trend of development of the continuous casters, which are mainly reflected in: 1) High flatness requires that the roller lines must be compact and dense, which requires the bearing housing to adopt a correspondingly thin and even miniaturized design; 2) The manufacturing process of special steel grades requires the continuous casting roll systems to be able to withstand higher temperatures. The above-mentioned trend of development calls for a bearing housing solution that has better cooling performance and thus can meet the ever-increasing cooling requirements of the continuous casting systems.

SUMMARY OF THE INVENTION

In order to solve the above-mentioned problems, the present invention provides a bearing housing that is provided with a cooling channel in at least part of the circumference around the bearing. The cooling channel is provided with a flow guide member in at least part of its flow section to construct a tortuous passage whose flow distance is longer than the corresponding circumferential length of the flow section.

The above-mentioned bearing housing adopts an optimized design of the cooling channel, with which a better cooling effect can be achieved without changing the other structures of the bearing housing. The above-mentioned advantage enables a bearing housing to have extremely strong versatility, which can be directly used to replace the bearing housings of the existing continuous casting systems. Such bearing housing is particularly suitable for upgrading and transforming the old equipment and therefore has a huge cost advantage and a wide range of application prospects.

It should be noted that the present invention constructs a tortuous passage in the original cooling channel of the bearing housing to improve the heat exchange efficiency without changing the existing water cooling system of the continuous caster, which has reversed the long-standing technical prejudice and narrow thinking of those who have been obsessed with improving the cooling effect by "expanding/enlarging" the cooling channel, and which has solved the technical problem that has long troubled the metallurgical industry in which the high temperature of a continuous casting machine leads to early failures of the bearings.

On the basis of the above-mentioned bearing housing, the present invention also provides a bearing housing unit, a continuous casting roll line and a continuous casting machine that use the bearing housing, as detailed in the following description.

The various embodiments and beneficial technical effects of the present invention will be described in detail below with reference to the accompanying drawings.

DETAILED DESCRIPTION OF EMBODIMENTS

In the following description, terms indicating directions, such as "axial", "radial" and "circumferential direction", unless otherwise specified or delimited, refer to the axial, radial and circumferential directions of the cage or the bearing to which the cage belongs.

As mentioned above, the technical efforts intended to improve the cooling effect by "expanding/enlarging" the cooling channel is limited by the overall radial size of the continuous casting roll line, and so it is difficult to further improve the cooling performance of the cooling channel to a greater extent. This prompted the inventor to further consider the essence of the heat exchange problems from the perspective of thermodynamics. Theoretically, the heat exchange efficiency of a cooling channel mainly depends on the water flow velocity and the area of the cooling channel exposed to water which participates in the heat exchange. When the heat exchange area is basically the same, the water flow velocity becomes a factor that has a decisive influence on the heat exchange efficiency.

Figure 1:
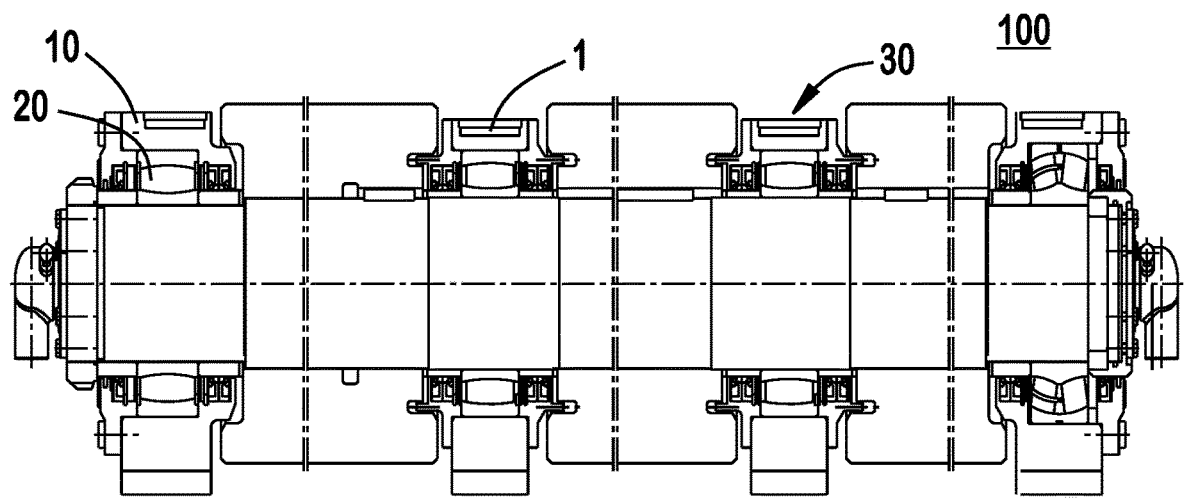
FIG. 1 is a schematic diagram of the cross-section of the structure of a continuous casting roll line in a continuous casting machine.
Figure 2:
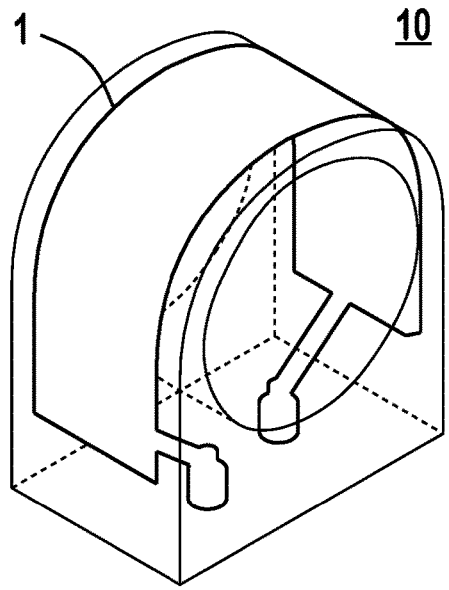
FIG. 2 is a schematic diagram of the shape distribution of a traditional cooling channel in the bearing housing.
Figure 3:
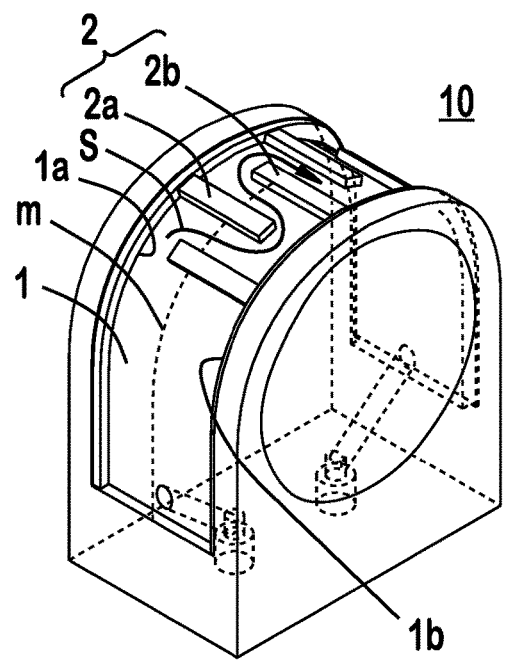
FIG. 3 is a schematic diagram of the structure of the cooling channel of the bearing housing according to the present invention.

FIG. 3 is a schematic diagram of the internal structure of the cooling channel of the present invention. From the figure it can be seen that the cooling channel 1 is provided with flow guide members 2 spaced apart in the circumferential direction. The flow guide members can be divided into two groups 2a and 2b according to their respective positions in the axial direction, starting from the two side edges 1a and 1b of the cooling channel in the axial direction, respectively. The two sets of guide members 2a and 2b each extend to the opposite side, with the free ends thereof all exceeding the middle line m of the cooling channel such that they are mutually staggered in the axial direction. The staggered flow guide members 2a and 2b define a tortuous passage S in the cooling channel through which the water flow actually passes. It is not difficult to understand that the length of the circuitous passage S is significantly greater than the arc length of the circumference corresponding to the flow section where the passage S is located.

According to the conservation of flow (also known as the "hypothesis of fluid continuity"), the inflow and outflow of a fluid without compressibility through a channel at any time should be equal. Therefore, with the above-mentioned diversion flow design, the flow velocity of the water in the tortuous passage S should greatly exceed the flow velocity of the water in the cooling channel when the diversion flow is not adopted. Therefore, the greatly increased flow velocity can significantly improve the heat exchange efficiency of the water in the cooling channel.

Figure 4A:
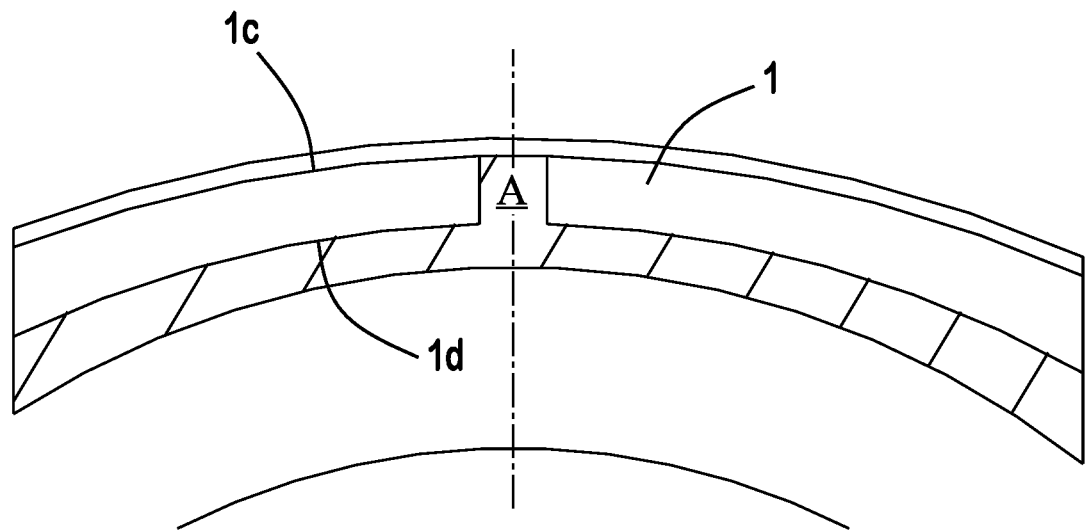
FIG. 4A is a schematic diagram of one embodiment of the flow guide members distributed in the cooling channel from an axial perspective.

FIG. 4A is a schematic diagram of the flow guide members distributed in the cooling channel from an axial perspective, which shows the guide members 2 are formed integrally with at least one of the top 1c and the bottom 1d of the cooling channel in the radial direction. Taking the solution A shown in the figure as an example, the guide members 2 can be integrally formed with both the top 1c and the bottom 1d by bonding or casting, so as to completely define a closed circuitous passage S in the cooling channel 1, forcing the water to completely meander and flow in the passage S.

Figure 4B:
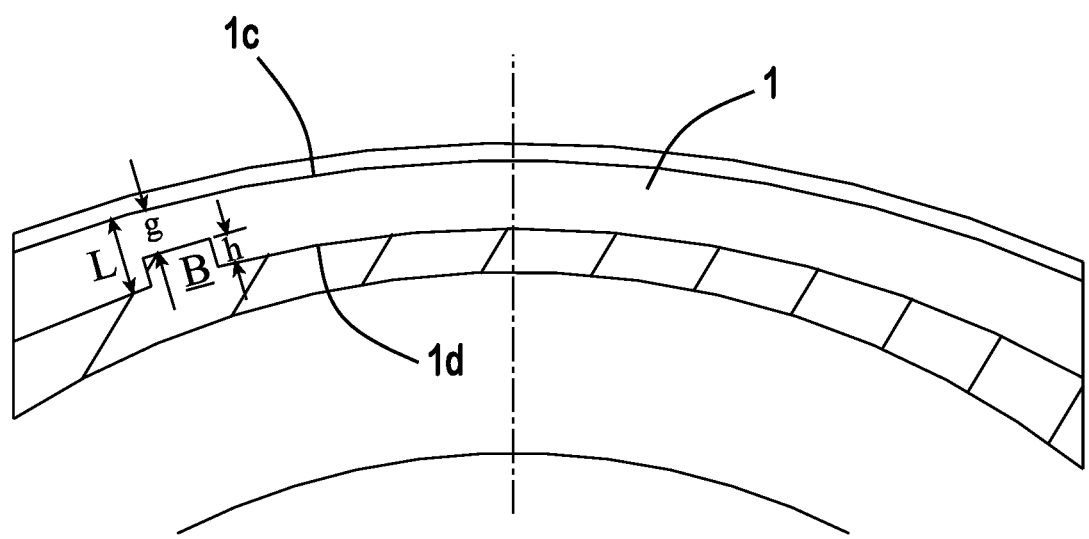
FIG. 4B is a schematic diagram of one embodiment of the flow guide members distributed in the cooling channel from an axial perspective.
Figure 4C:
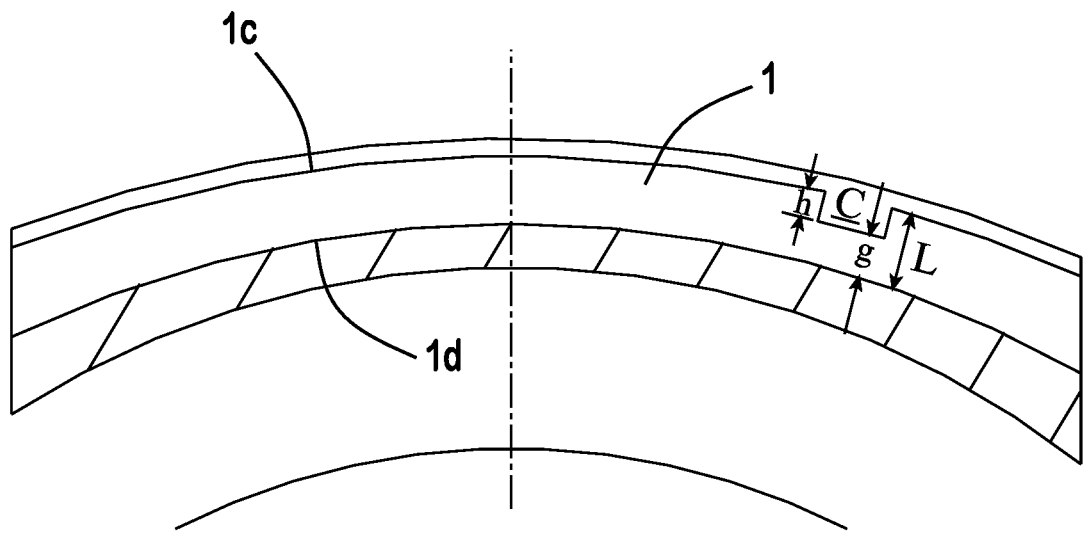
FIG. 4C is a schematic diagram of one embodiment of the flow guide members distributed in the cooling channel from an axial perspective.
Figure 5:
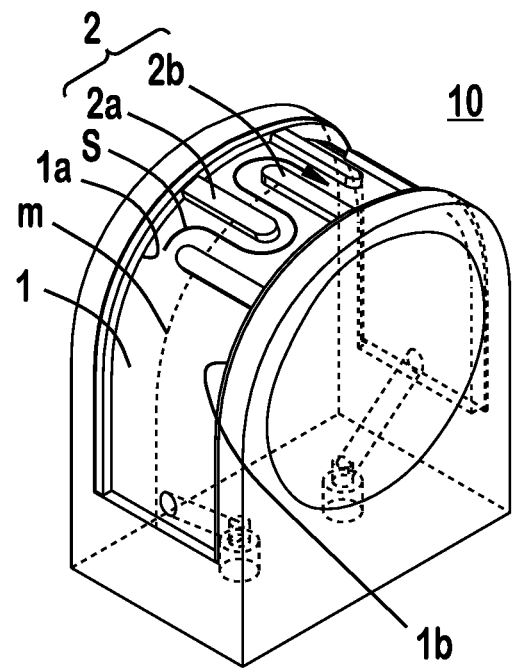
FIG. 5 is a schematic diagram of one embodiment of the structure of the cooling channel of the bearing housing according to the present invention.

Alternatively, in the solutions B and C shown in FIGS. 4B and 4C, the flow guide members 2 are formed integrally with only one of the top 1c and the bottom 1d of the cooling channel 1. The top 1c may further comprise a cover. The cover may extend over the channel and form an outer surface of the housing thereby enclosing the channel 1. In this case, the flow guide members 2 may be formed into a substantially dam shape, with a radial gap g formed between the top or bottom not covered by it. This means that the water will form a complex situation of mixed flow in a parallel channel composed of the tortuous passage S and the gap passage g. On the one hand, the mainstream of the water flow is still limited by the tortuous passage, resulting in its average flow velocity still significantly higher than that in the traditional cooling channel. On the other hand, the incorporation of the gap passage will increase the intensity of turbulence, which is particularly beneficial to the improvement of heat exchange efficiency.

From a geometrical point of view, the structural complexity of the cooling channel will generally cause an increase in the internal heat exchange area. Still taking solutions B and C shown in FIGS. 4B and 4C as an example, the top or bottom area covered by the guide members 2 will be supplemented by the area exposed to the water, and the area of the latter will be generally larger than the area of the former. Therefore, from the final result, the heat exchange area inside the cooling channel should be increased. On the basis of increasing the flow velocity, the increase in the heat exchange area is obviously beneficial to further improve the heat exchange efficiency of the cooling channel.

In the technical solutions B and C shown in FIGS. 4B and 4C, the ratio of the radial height (the part exposed to water) h of the guide members to the top-bottom spacing L of the cooling channel is at least 50%. As a preferred embodiment, the ratio can be further increased to more than 80%. The flow guide members within the above-mentioned height range on the one hand can still confine the mainstream of the water flow within the tortuous passage S. On the other hand, it can also use the flow merged by the gap passage g to promote a strong turbulence effect. The analysis shows that the overall heat exchange efficiency of this design is significantly higher than that of the traditional cooling channel.

As a further preferred embodiment, the part of the flow guide members exposed to the water is preferably sloped and/or rounded, so as to avoid an obtrusive shape that causes more resistance to the water flow. The so-called sloping is to make the surface washed by the water flow into a shape similar to the slope of a dike to reduce the resistance of the fluid when it passes. By the way, part of the resistance encountered by the fluid flowing in a pipeline (referred to as "pipe resistance") comes from the resistance generated by the internal friction of the fluid (also known as the "along-path resistance"), and the other part comes from the resistance of the pipeline shape to the fluid (referred to as "physical resistance"). Pipe resistance is the root cause of energy loss and pressure loss when a fluid flows in a pipeline. Therefore, the above-mentioned optimized design is beneficial to reduce the power loss and head loss of the water pump caused by the pipe resistance.

The specific embodiment in which the two sets of guide members 2a and 2b form a tortuous passage through axial staggering are described above with reference to FIGS. 3 and FIGS. 4A-4C. Those skilled in the art should appreciate that the flow guide members of other grouping manners, such as three or more than three groups, can also be arranged and distributed to form a tortuous passage in the circumferential direction. Not only that, the guide members extending in the circumferential direction, such as wave-shaped or zigzag-shaped (hereinafter referred to as "roughly serpentine"), can also construct a tortuous passage. It can be seen that any type of flow guide members, regardless of whether they are continuous, morphological orientation, or the number, as long as a tortuous passage with a flow length longer than the circumference of the corresponding flow section can be constructed in the cooling channel, the purpose of the present invention to improve the heat exchange efficiency by increasing the flow rate can be achieved.

Although water is used as a refrigerant for heat exchange in the existing continuous casting roll cooling systems, it is easy to understand that other types of refrigerants, such as ammonia, freon, etc., can also be guided by the guide members to flow in the tortuous passage, by means of which the objective of the present invention can also be achieved. In other words, the function of the tortuous passage is universal, which has nothing to do with the type of refrigerant.

From the above description it can be seen that the bearing housing adopting the above-mentioned improved design is particularly suitable for forming a bearing unit with the bearing to support the continuous casting roll line thereby meeting the requirements of a continuous casting machine for higher cooling performance. Not only that, but the bearing housing is also suitable for supporting all bearings and/or shaft systems with cooling requirements.

Those skilled in the art should understand that the bearing housing and its applications are not limited by the above specific embodiments. More general technical solutions will be subject to the limitations in the appended claims. For any changes and improvements of the present invention, as long as they meet the limitations of the appended claims, they fall within the protection scope of the present invention.

The invention claimed is:

1. A bearing housing comprising:
a cooling channel extending around a circumferential length of the bearing housing, the cooling channel being defined by a top surface and a bottom surface, the cooling channel comprising:
flow guide members configured to construct a tortuous passage, the flow guide members comprising a radial height being at least 50% but less than 100% of a height of the cooling channel as measured in a radial direction between the top surface and the bottom surface,
wherein the tortuous passage comprises a flow distance, the flow distance being longer than the circumferential length;
wherein the flow guide members are configured such that the tortuous passage extends substantially in a serpentine shape along the circumferential length.

2. A bearing housing comprising:
a cooling channel extending around a circumferential length of the bearing housing, the cooling channel being defined by a top surface and a bottom surface, the cooling channel comprising:
flow guide members configured to construct a tortuous passage, the flow guide members comprising a radial height being at least 50% but less than 100% of a height of the cooling channel as measured in a radial direction between the top surface and the bottom surface,
wherein the tortuous passage comprises a flow distance, the flow distance being longer than the circumferential length;
wherein the flow guide members are arranged at intervals along the circumferential length, so as to construct the tortuous passage through a distributed arrangement thereof.

3. The bearing housing according to claim 2, wherein the flow guide members comprise:
a first group, the first group comprising a first portion of the flow guide members that axially abuts a first side edge of the cooling channel, and a first plurality of free ends defined by being axially opposite the first portion of the flow guide members; and
a second group, the second group comprising a second portion of the flow guide members that axially abuts a second side edge of the cooling channel, and a second plurality of free ends are positioned axially opposite the first portion, the second portion of the flow guide members;
wherein the first plurality of free ends extends past a axial center line of the cooling chamber, and the second plurality of free ends extends past the radially center line of the cooling chamber.

4. The bearing housing according to claim 1, wherein the flow guide members are formed integrally with at least one of the top surface and the bottom surface.

5. The bearing housing according to claim 4, wherein a part of the flow guide members exposed to the cooling fluid is sloped and/or rounded.

6. The bearing housing according to claim 4, wherein the flow guide members are formed integrally with only one of the top surface and the bottom surface.

7. A bearing housing unit comprising:
a bearing housing comprising a cooling channel, the cooling channel extending around a circumferential length of the bearing housing, the cooling channel being defined by a first axial side edge and a second axial side edge which both extend entirely circumferentially along the circumferential length;
a flow guide member being positioned between the first axial side edge and the second axial side edge and configured to construct a tortuous passage, wherein the tortuous passage comprises a flow distance being longer than the circumferential length, the tortuous passage abutting the first axial side edge and the second axial side edge; and
a rolling bearing being arranged in the bearing housing.

8. A continuous casting machine comprising:
a continuous casting roll line, the continuous casting roll line further comprising a bearing housing unit, the bearing housing unit comprising:
a bearing housing comprising a cooling channel extending around a circumferential length of the bearing housing, the cooling channel being defined by a first axial side edge and a second axial side edge which both extend entirely circumferentially along the circumferential length;
a flow guide member being positioned between the first axial side edge and the second axial side edge and configured to construct a tortuous passage, the tortuous passage abutting the first axial side edge and the second axial side edge, wherein the tortuous passage comprises a flow distance being longer than the circumferential length, and
a rolling bearing being arranged in the bearing housing.

* * * * *